United States Patent [19]

Wright

[11] Patent Number: 4,618,895
[45] Date of Patent: Oct. 21, 1986

[54] VIDEO EDITING SYSTEM

[76] Inventor: Bruce R. Wright, 1006 Nana, St. Louis, Mo. 63131

[21] Appl. No.: 528,047

[22] Filed: Aug. 31, 1983

[51] Int. Cl.$^4$ .......................... H04N 9/79; G11B 27/08
[52] U.S. Cl. ..................................... 358/311; 358/908; 358/27; 360/14.2; 360/31; 360/15
[58] Field of Search .................... 360/14.1, 14.2, 14.3, 360/31, 15; 358/311, 908, 10, 27, 26

[56] References Cited

U.S. PATENT DOCUMENTS

| | | | |
|---|---|---|---|
| 3,591,730 | 7/1971 | Chang | 360/79 |
| 3,647,951 | 3/1972 | Rose | 360/14.2 |
| 3,890,639 | 6/1975 | O'Donnell | 360/14.1 |
| 4,067,049 | 1/1978 | Kelly | 360/14.3 |
| 4,115,819 | 9/1978 | Shigeta | 360/14.1 |
| 4,259,689 | 3/1981 | Bonner | 358/908 |
| 4,283,735 | 8/1981 | Jagger | 358/311 |
| 4,290,087 | 9/1981 | Bixby | 360/14.1 |
| 4,319,286 | 3/1982 | Hanpackern | 358/908 |
| 4,390,904 | 6/1983 | Johnston | 358/908 |
| 4,467,371 | 8/1984 | Kobayashi | 360/14.3 |

Primary Examiner—Alan Faber
Attorney, Agent, or Firm—Jerome A. Gross

[57] ABSTRACT

A video editing system uses apparatus for connection with a video playback machine (first VCR) and a dub video recorder, (second VCR). The apparatus includes tone generator circuitry for generating an edit tone to be recorded upon an audio track of a color master video tape which has been preselected for edit duplication. Control circuits allow selectively supplying the edit tone to the first VCR for recording upon the audio track to differentiate selected from unselected portions of the video track of the tape. Tone decoder circuits decode the recorded edit tone upon playback of the master tape. Circuits control starting and pausing of the second VCR in response to the decoded presence or absence of the recorded edit tone. Accordingly, the second VCR when connected to the first VCR produces an edited first copy video tape by duplication only of the selected portions of the master video tape. A video monitor is used for receiving and viewing the video signals from the playback machine, and control circuitry responds to decoding of the edit tone for deleting color from the monitor during playback of the unselected tape portions. Circuitry may be included for causing diminished audio volume during playback of the unselected portions. A process of preparing the color video master for self-editing by use of such apparatus also is disclosed.

22 Claims, 4 Drawing Figures

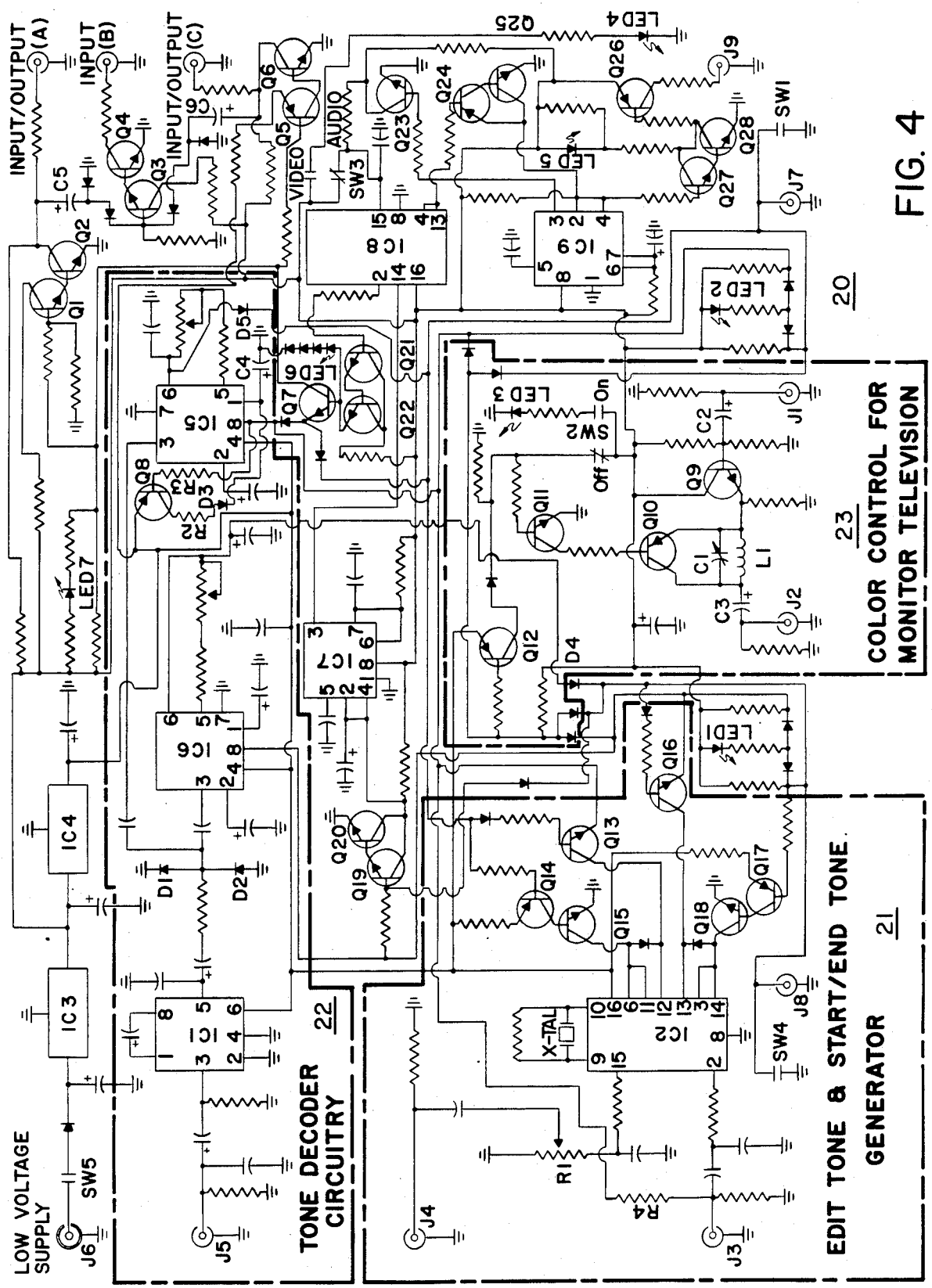

VIDEO EDITING SYSTEM

BACKGROUND AND SUMMARY OF THE INVENTION

This invention relates to video editing and, more particularly, to a system involving apparatus and methodology for preparing a color master video tape in such a way that it becomes video self-editing when subsequently played across to a video recorder.

In the last few years, there has been a great growth in the development of home video recording and editing. Domestic users of home video equipment often desire to edit initial or "master" video tapes so as to delete scenes from them or to provide a rearrangement of scenes which will produce a more desirable tape. For example, a home video recording enthusiast may, after having recorded an initial tape, prefer to edit out commercial messages or less-preferred scenes or segments. Commercial users can have the same problems.

Using a first or "master" video tape in this mode typically involves playing back a master video tape on a playback recorder while using a record or "dub" video recorder to record only those scenes which are desired on the edited tape. This may be carried out by manually starting and pausing the dub video recorder while watching the first tape as it is being played on the playback recorder. The resultant tape produced by the dub video recorder now becomes a new master tape which can be used to produce, by the connection of a video tape recorder to a first playback machine, a duplicate tape.

However, such an editing approach involves several serious limitations: Since the edited video tape is in actuality a second copy, or second-generation tape, it will when played back as a new "master" provide degraded picture quality and a diminished signal-to-noise ratio. Also, the second-copy master video tape can only be further shortened or edited with even greater loss of fidelity and degradation of its video and audio recording tracks. Also, if further edited, the second-copy master provides a third-generation copy which may for many needs be almost useless, such as when played back it may not even have sufficient signal levels for providing synchronization and stability of the playback picture. The usual method as above described for obtaining a second-copy master video tape of edited character is also disadvantageous in that if it is not satisfactory or if further editing should later be desired, one would have to go completely once more through the entire editing process with respect to the original master thereby to produce a differently-edited second-copy master version. Far more desirable would be the capability of using the original master in such a way that edited copies could be made directly from it. However, prior to the present invention, the typical amateur or non-professional person has found it difficult, if not impossible, to know which scenes are to be deleted from the original master and where such scenes are precisely to begin and end, so that repeated duplication is difficult.

An additional difficulty with the prior art approach of making a second-generation master with the use of non-professional, domestic home recording equipment arises as follows: Domestic type video recorders have an ultimate protective shutdown feature which typically causes the rotating recording head to stop rotating about five minutes after tape movement is stopped. This is to prevent the tape from being worn through by the head. In conventional editing prior to this invention, the user typically has had to shut down the recorder frequently, sometimes for protracted periods, causing the rotating head to stop. Because the recording track consists of multiple diagonal tracks or strips across the surface of the tape, any effort to join two segments together, where the recording head has stopped at the beginning or end of such a segment, will result in a large visual discontinuity upon the screen, wherein the picture may actually collapse, or partial raster occurs and even resulting sometimes in short segments wherein there is a totally blank or noise-filled screen. The resultant adjacent segments, undesirably interrupted by this cessation or collapse of the video, are quite distinct from one another, and annoying abrupt transition from scene-to-scene result.

Professional equipment does exist which can be used by professional studios and those in the television industry to make high quality second generation tapes which have an adequate signal to noise-ratio and synchronization signals of proper level for assuring a clean, noise-free playback of proper level for assuring a clean, noise-free playback of the second generation master. Professional equipment can also avoid such annoying transitions between scenes. But such equipment either is not readily available to the home video enthusiast or is so expensive as to be beyond being affordable.

The present invention, insofar as it utilizes tones recorded on the original master video tape for causing the master tape to be automatically self-editing when played from a video playback machine across to a dub video recorder, is concerned with previous efforts to record tones upon tape. In Bixby et al U.S. Pat. No. 4,290,087, for example, there is disclosed a system for playback of segmented video information on a tape. By recording only signals of a predetermined quality on an ancillary recording medium, playback of video information from the ancillary medium will produce a coherent display on a display monitor. However, this system is primarily used to improve the frame-by-frame quality and is concerned with a commercial video editor. It is not a system for video self-editing of a master video tape.

Hanpachern U.S. Pat. No. 4,319,286, teaches a system for detecting fades in television signals to delete commercials from recorded television broadcasts. But such a system is used only for deletion of the commercials from a transmitted broadcast when utilizing a video tape recorder for making a first-generation recording of the broadcast signal. It is not useful for causing deletion of selected video segments but rather all commercials which will produce the requisite fade of the signal to which such system responds.

For sound editing, it has been known, as proposed in Kelly et al, U.S. Pat. No. 4,067,049, to store on a second-generation magnetic tape signals for insertion at selected locations of special recorded sound effects. In this way, the second generation tape can be used, in effect, to key the playing back of additional sounds as for use in a television program.

Indeed, it is concededly known that control tones can be recorded upon video tape recordings, as through the use of home video recorders, such as for providing cueing or locating marks on the video or audio channels for the purpose of marking or locating the beginning of a recorded program; just as such signals have been recorded heretofore on sound magnetic recording tape to mark the beginning of a piece of music, or its end.

But none of these disclosures of the prior art have been useful for preparing a first-generation video tape for video self-editing when subsequently played across to a video dub recorder.

Accordingly, it is an object of the present invention to provide a process of preparing a video tape for video self-editing when subsequently played across to a video recorder, in effect allowing a first generation video tape to serve as a master from which edited copies may be made directly.

A further object of the invention is the provision of such a process which is especially useful for preparing a color video tape, so that upon playing back of such video tape, a characteristic indication may be given to the user of those video segments which have been selected for duplication and those segments which have not been selected, and wherein such indication can be provided either visually or aurally, or provided both visually and aurally.

It is also an object of the invention to provide such a process which does not disturb or in any way change the video information recorded initially upon the master video tape, which does not alter or delete color signals recorded thereon, and which retains and does not interfere with audio information recorded upon such tape.

It is a further object of the invention to provide a process for pre-selected editing and subsequently duplicating only the pre-selected portions, either of a single video tape from which an edited second-generation copy is then produced by a single uninterrupted playing, or from a plurality of such pre-edited video tapes, composed in a preselected order.

It is an object of the invention also to provide apparatus for video editing capable of use with a video playback machine and a video recorder which will allow the recorder to produce an edited first-copy video tape by duplication only of preselected portions of a master video tape without interruption of the playing of the master video tape by the video playback machine.

It is a further object of the invention to provide such video editing apparatus which will provide the user with a characteristic visual indication of those portions of the tape which have been selected for duplication, and wherein such indication involves displaying on a monitor the selected portions in color and black-and-white, a related object being to provide apparatus which, during playback of the master tape, provides aural indication of the selected and unselected portions by causing the audio volume for unselected segments or portions to be diminished in volume.

Additionally, it is an object of the present invention to provide such video editing apparatus which will signal the beginning and end of a series of selected portions; and a related object is to provide such apparatus which automatically will respectively enable and disable editing functions of the apparatus at the beginning and end of a series of selected portions.

It is also an object of the invention to provide such video editing apparatus which can be used not only for preparing a video tape for video self-editing, but also for thereafter causing the tape to be self-editing when played across to a video recorder, as well as for providing characteristic indication to the user by monitor display of the selected and unselected portions of the tape so prepared.

It is an object of the invention to provide such a process and apparatus which allow preparing of the video tape which not only has the capability of being self-editing for producing a first copy of only selected video signals of the tape, but also retaining a capability for being subsequently changed whereby it can provide for subsequent self-editing production of a first copy of different selected portions.

Among other objects of the invention may be noted the provision of such apparatus which avoids the objectionable starting and stopping of the recording head of a dub video recorder connected to it, thereby preventing objectional gaps or discontinuities between scenes of the edited tape copy.

Briefly, video editing apparatus of the invention is used with a conventional video playback machine, such as a first VCR, and a dub video recorder, such as a second VCR. The apparatus includes tone generator means for generating an edit tone to be recorded upon an audio track of a master video tape which has been preselected for edit duplication. Control means is included for selectively supplying the edit tone to the playback machine for recording upon the audio track to differentiate selected from unselected portions of the video track of the tape. The apparatus includes tone decoder means for decoding the recorded edit tone upon playback of the master tape. Dub video recorder control means is provided for controlling starting and stopping of the dub video recorder in response to the decoded presence or absence of the recorded edit tone, as determined by the tone decoder means. Accordingly, the dub video recorder when connected to the playback machine will produce an edited first copy video tape by duplication only of the selected portions of the master video tape, and without interruption of the playing of the master video tape. According to the preferred construction, a video monitor is used for receiving and viewing the video signals from the playback machine, the apparatus including further control means responsive to decoding of the edit tone for causing the video monitor to delete color during playback of the unselected portions of the master video tape. The apparatus may also include circuitry for causing diminished audio volume of the signals provided to the video monitor during playing back of the unselected tape portions.

A process of preparing a color video tape for self-editing according to the invention involves the steps of (1) playing an initial portion of the tape on the playback machine while simultaneously viewing same on the color video monitor to the conclusion of a first segment or portion selected for such subsequent duplication; (2) while so playing and viewing, laying down on an audio track of the video tape signals to differentiate portions of the tape selected for duplication from unselected portions thereof, and to start and stop the dub video recorder; (3) so controlling, by the presence or absence of said signals, the video input to the monitor so as to delete color from such video input simultaneously with the display of unselected portions of the video tape; and (4) repeating the aforesaid steps for subsequent portions of the tape. Accordingly, by adjusting the position of such recorded signals as laid down on the audio track, the absence of color on the monitor screen indicates the portions which will be self-edited from the tape when thereafter played across to the dub video recorder.

Other objects and features will be in part apparent and in part pointed out hereinbelow.

BRIEF DESCRIPTION OF THE DRAWINGS

FIG. 4 is a schematic circuit diagram of video editing circuitry of the invention.

Corresponding reference characters indicate corresponding parts throughout the several views of the drawings.

DESCRIPTION OF THE PREFERRED EMBODIMENTS

Overall System

Figure 1:
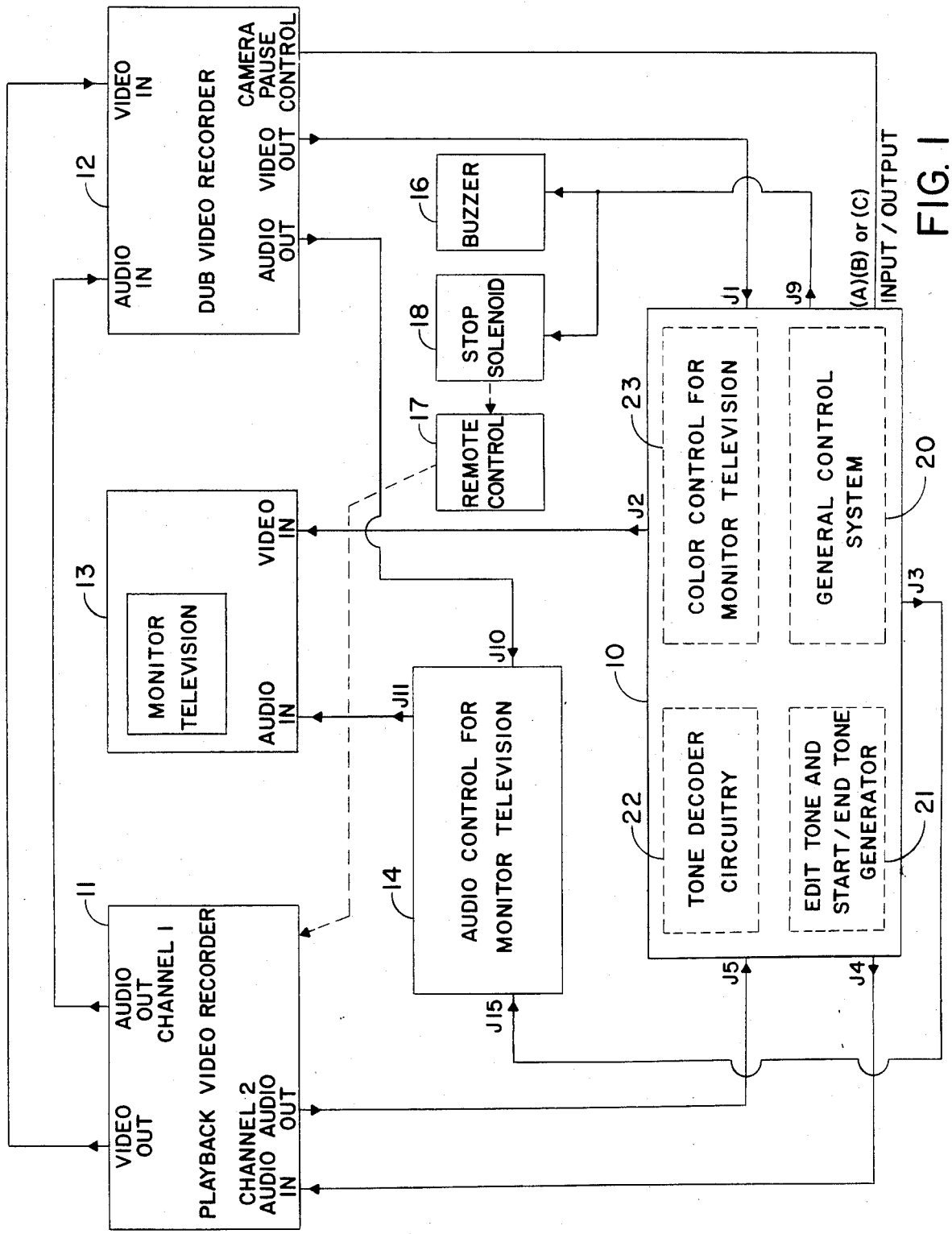
FIG. 1 is a circuit block diagram of apparatus of a system configured in accordance with the present invention for preparing a video tape such that it is self-editing when played back on a so-called dub video recorder from a so-called playback video recorder, such recorders, together with a monitor television, being shown interconnected with apparatus of the invention.

Referring now by reference characters to the drawings, designated at 10 is a video editing apparatus of the invention as represented in block diagram form and as shown interconnected with a video playback machine 11 which is referred to herein as a playback video recorder and such may be the conventional type of domestic video cassette recorder (VCR) such as the type used by many persons for personal or commercial purposes for recording video programs received over ordinary television receivers or recording from a video camera input. Thus, VCR 11 may be one which is utilized by the user of the new video editing system 10 for such purposes. VCR 11 is shown interconnected with a second "dub" video recorder 12 which also may be a conventional VCR, most preferably of the type which is capable of receiving a video camera input. By the use of said VCR's 11 and 12, the user of the new system 10 may provide edited first-copy tapes in response to a master video tape which has been prepared in accordance with the invention.

For that purpose, a master video tape is played back on VCR 11, the video output of which is provided to the video input of VCR 12. Similarly, the output of at least a first audio channel of VCR 11 is supplied to the audio input of VCR 12. At 13 is designated a monitor television which may be a conventional television receiver or a video monitor per se. Monitor 13 has a sound system associated with it for listening to the sound track of the tape played by VCR 11. An audio control 14 for the monitor television 13 is shown connected with editing system 10 and operating as an adjunct of the system for controlling the volume of sound provided by system 10 to monitor 13.

Generally speaking, video editing system 10 is useful for preparing a master color video tape for subsequent self-editing duplication. For this purpose, video editing system 10 is shown interconnected with VCR 11 for supplying certain edit tones to the second audio input of VCR 11. System 10 is connected also for receiving audio signals from the second channel of the tape played by VCR 11. Further, video signals, as received from VCR 12 and processed by editing system 10, are supplied from the latter to monitor television 13 to its video input.

When so prepared, the master tape, as placed on VCR 11 after recording, or as recorded on VCR 11, will cause system to control VCR 12 as the tape is played across from VCR 11 to VCR 12. With VCR 12 under the control of editing system 10, VCR 12 will automatically "dub" a first level duplicate tape, or copy, with the copy being automatically edited to remove portions of the video tape which is desired to edit out. For this purpose, editing system 10 causes VCR 12 to start and stop automatically whereby the copy tape produced by VCR 12 will have only the selected portions of the master video tape.

Further, editing system 10 can be used in an optional mode to cause whole sequences of the master video tape on VCR 11 to be included, and to reject other sequences, providing automatic initiation of the editing function by operation of VCR 12 so as to enable the editing mode at the beginning of a sequence of selected portions of the master video tape on VCR 11, and to cause signalling, such as through use of a buzzer 16, upon reaching the end of a series of selected portions, all of which have been recorded by VCR 12. Additionally, a remote control device 17 can be used then to shut off VCR 11, such remote control being under the control of a stop solenoid 18 which is actuated simultaneously with buzzer 16.

It should be here emphasized that the user of editing system 10 need initially only have access to a single VCR 11, which can be used in connection with the editing system to prepare the master video tape for subsequent self-editing. Then, when it is desired to make an edited copy, the dub video recorder (VCR 12) may be acquired only at the proper time, such as being rented only for a short interval adequate for preparing the dub copy tape. All edits are done, in other words, on the master video tape using VCR 11.

Color and Sound Monitor Functions

In accordance with the invention, the user of the new editing system 10 can use monitor 13, and its sound system (if utilized in connection with audio control 14) for giving a characteristic indication of those unselected portions of the master video tape which are to be edited out. In other words, editing system 10 can be used to cause the monitor 13 to provide a characteristic video indication which will dilineate between the selected portions and the unselected portions of the master video tape. For this purpose, monitor 13 is controlled by editing system 10 in such a way that color will be deleted from signals supplied to monitor 13 during playback of VCR 11 for unselected portions of the master video tape. Selected portions will, on the other hand, appear in normal color on monitor 13. Such monitor indication can be used whether or not VCR 12 is employed, and during the editing process being useful to provide the user with a clear indication of those scenes which are to be edited out of the master video tape. As noted above, if audio control 14 is also used with editing system 10, the sound volume of audio signals provided during playback of the master video tape by VCR 11 will be diminished in volume during unselected portions of the tape, i.e., such portions as are to be edited out. In other words, the user is provided not only with a visual indication, but also (if audio control 14 is included) with an aural indication characteristic of those scenes which are to be edited out.

Therefore, editing system 10 can be used with or without audio control 14. Further, the end-of-sequence buzzer 16, remote control 17 and stop solenoid 18 are also optional. With respect to remote control 17, such may be of conventional type such as will provide infrared or ultrasonic signals for remote control of VCR 11 and/or VCR 12. If VCR 11 and VCR 12 are not of remote controllable type, remote control 17 together with stop solenoid 18 are not utilized. However, in that event, the user may still use optional buzzer 16 to be aurally alerted to the end of a sequence of selected portions.

Editing system 10 is useful with any number of different brands or types of VCR's but, as noted, VCR 12 is most preferrably of the type which has a video camera input and thus a camera pause control input of the VCR which is connected, as shown, with editing system 10.

Editing System Sections

With specific reference now to the features of editing system 10, it will be observed that there is a general control system 20 including means for selectively supplying so-called edit tones and start-end tones to the playback VCR 11, such control system 20 causing such tones to be generated by an edit tone and start/end tone generator 21. During subsequent playback, tone decoder circuitry 22 of the invention determines the presence or absence of the edit tone and/or start/end tone. Such tones are recorded on the second audio channel of the master video tape. These tones may be subaural, within the normal hearing spectrum, or superaudible (ultrasonic). Normally, the second audio channel of the master video tape is not utilized, the normal program sound being recorded upon the first audio channel. The tones are recorded on the second channel. It will be here emphasized that the editing system 10 does not cause any change in the video signals which are recorded originally upon the master video tape, such as by playback VCR 11. Editing system 10 causes the deletion of color from video signals during playback of the master video tape by VCR 11. A color control 23 of video editing system 10 is included for automatically causing deletion of the color subcarrier from the video as supplied by editing system 10 through monitor television 13 during display of unselected portions of the master video tape. The unwanted scenes are in black-and-white and the wanted scenes are in color.

General Editing Result

Figure 2:
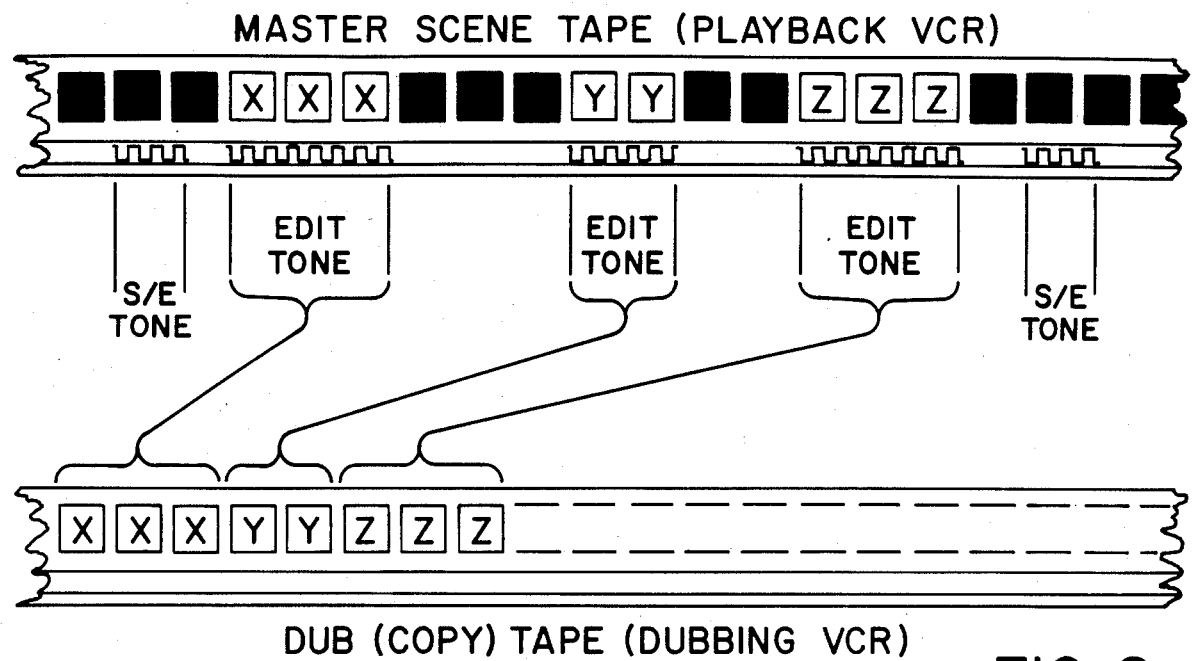
FIG. 2 is a pictorial representation of a master tape and a dub (copy) tape, the master tape containing segments which it is desired to be automatically self-edited, as well as the selected portions which will be retained when the master tape is played across to the dub video recorder, the dub (copy) tape showing the selected portions resulting from such self-editing.

Reference is made to FIG. 2 for an explanation of the recording of the edit tones and start/end tones upon the master video tape. In FIG. 2, it is seen that the master video tape includes unselected portions or scenes which are represented as blacked-out areas of the master video tape. These may represent commercial messages, extraneous material, or simply less-preferred portions of a recording which the user desires to edit out. The master video tape is seen to include segments each indicated at "X" which are desired to be retained. Similar segments are designated at "Y" and "Z", being separated by unwanted portions of the tape. In accordance with this invention, an edit tone is laid down upon the audio track of the master video tape only during such portions, as "X", "Y" and "Z" which are desired to be retained on the dub (copy) tape. Therefore, it is seen that the edit tone is present on the audio track throughout the full extent of each of the adjacent selected portions. After the master tape is prepared by so laying down the editing tone, editing system 10 when connected to VCR 11 and VCR 12 as described above, will cause dub VCR 12 automatically to prepare an edited first-copy version of the master tape, and such version is the dub, or copy, tape so illustrated in FIG. 2, wherein the selected portions "X", "Y" and "Z" are now shown to be contiguous and uninterrupted by any unwanted, unselected portions of the master video tape. The function of the start/end tones will be more fully described below, but it will be noted that such tones mark the beginning and end, respectively, of a sequence of desired, selected portions. Therefore, a start/end tone (indicating the start of the desired sequence) may be laid down on the audio track of the master tape before the first series of selected portions "X". Similarly, following the last of the desired portions "Z" has occured on the master tape, a start/end tone (signalling the end of the desired sequence) may also be laid down on the audio track.

Editing System Circuitry

Referring to FIG. 4, tone generator 21, decoder circuitry 22, and color control 23 are generally outlined by dashed lines, while general control system 20 comprises control elements other than those areas so blocked out, as well as control circuitry overlaid with elements 21, 22 and 23. Since color control 23 is an important part of system 10, it is first described. In FIG. 4, the designations IC1–IC9 refer to integrated circuits of commercially available type.

Color Control

Color control 23 serves as means for causing color to be deleted from video signals from VCR 11 both during editing as well as when the master tape is played across from VCR 11 to VCR 12. Control 23 consists of transistors Q9, Q10, Q11, Q12, and a band reject filter consisting of inductor L1 and an adjustable capacitor C1. A standard one volt peak-to-peak video signal from VCR 12 (or VCR 11 if during editing) is fed into the input jack J1 through capacitor C2, then onto the base of Q9 transistor. Q9 amplifies the video signal and feeds it to the band reject filter and the emitter of Q10 which is a by-pass transistor. The output of the band reject filter is delivered by coupling capacitor C3 to the output jack J2 for connection to the video input of monitor 13. The gain of amplifier Q9 is used to make up for the losses occuring in the band reject filter and resulting from bypass transistor Q10, with the result being that control 23 has approximately unity gain between its input and output. The band reject filter is tuned for maximum rejection of the 3.58 Mhz color subcarrier used in the NTSC Color System in the United States, and when Q10 is nonconductive. Thus, when transistor Q10 is off, the amplified color signal from Q9 is fed through the band reject filter, removing the color picture information but leaving only the luminance or black-and-white information, which is at a much lower frequency.

Thus, when Q10 is off, there is provided a black-and-white picture on the monitor 13. Because this black-and-white picture information also contains the picture synchronization information, the picture will remain stable and not roll or break up when switching back and forth between color and black-and-white.

When transistor Q10 is turned on, the amplified video signal from Q9 is then bypassed around the band reject filter to the output; thus resulting in a normal color picture. Transistor Q11 serves as a switching means to turn Q10 on and off as required. Transistor Q11 is controlled by a video monitor switch SW2, which is user selectable. When SW2 is in the off position it causes Q11 to be on, in turn driving Q10 on, and so causing normal color video signal to be shown at all times on monitor 13. When switch SW2 is in the on position, transistor Q11 is then controlled solely by Q12. Q12 is controlled from four different circuits and will be turned on when:

1. Switch SW4 is closed or the center pin of external (accessory) jack J8 is grounded.
2. IC6 is decoding a start/end tone, causing IC6 pin 8 to switch to the low state.
3. Switch SW1 is closed or the center pin of external (accessory) jack J7 is grounded.
4. IC5 is decoding an edit tone, causing IC5 pin 8 to switch to the low state.

Collectively, Q10, Q11 and Q12 serve as electronic switching means, resposive to tone decoder circuitry 22, for switching video signals through the band reject filter in accordance with the decoded absence of edit tones on the master tape. A front panel indication of the functional position of SW2 is signalled by LED 3.

Edit Tone Generator

The edit tone and start/end tone generator 21 is next considered. The edit tone is generated by IC2, which is a crystal controlled dual-tone generator. IC2 is capable of generating multiple pairs of tones. An edit tone switch SW1 is located suitably, as on a front panel, for user operation, serves as a first control means for selectively supplying the edit tone to VCR 11 for recording upon the master tape, to differentiate positions selected for duplication from unselected portions. When depressed, switch SW1 causes transistor Q14 to be turned on, driving transistor Q15 on, and thereby pulling IC2 pins 6 and 11 low. This causes IC2 to generate two independent tones. One tone appears at pin 2 of IC2, and is routed to the monitor audio output J3. The other tone appears at pin 15 of IC2 and is routed through a tone level control R1, which preferably is on a front panel of the editor housing, and then to playback VCR audio output jack J4. This tone is thereby recorded on the second audio track of the master tape during the editing process. The tone level adjustment R1 is provided to permit the operator to select the ideal record playback level for the specific type of VCR 11 being used. The other tone, which appears at monitor audio output jack J3, is a much lower frequency and is provided at a fixed level so that the operator can determine when and for how long the edit tone is being generated. This tone is heard from the sound system of monitor 13 when the edit tone is being recorded, as well as when the edit tone is being played back and decoded. This audio tone may be supplied also to any other audio amplifier for audibly monitoring the presence or absence of the edit tone. Edit tone switch SW1 also causes Q12 transistor to turn on, causing monitor 13 to display a color picture if the video monitor switch SW2 is in the "on" position. This also causes an indicator lamp, LED2, to light. Edit tone switch SW1 also disables the edit tone decoder IC5 through diode D5 to prevent the tone generating and decoding circuits from becoming locked up.

Edit Tone Decoder

With respect to the tone decoder circuitry 22, when the master video tape is played back on VCR 11, the edit tones which were previously recorded are now played back from VCR 11 and fed into playback VCR audio input jack J5. From jack J5 the edit tone is amplified by IC1, a high gain audio amplifier, and is then diode clamped by diodes D1 and D2 before being fed to IC5, a phase locked loop tone decoder. When a tone is detected by IC5, it is decoded and appears at pin 8 which is normally high and goes low for the duration of the edit tone. This pulls the emitter of Q13 low, permitting Q13 to operate, thus pulling pins 6, 11, and 12 of IC2 low; causing a tone to be generated at pin 2 and fed to the monitor audio out jack J3. The edit tone is not generated at pin 15 because pin 12 is pulled low at the same time pins 6 and 11 are low. This prevents a situation where the edit tone would be fed to the VCR 11 and then back to the decoder causing these circuits to be locked up. Pin 8 of IC5 also turns transistor Q12 on, causing the monitor 13 to display a color picture, if switch SW2 is in the "on" position. IC5 pin 8 also enables transistor Q7 to operate if dub audio/video switch SW3 is in the dub video position, thus controlling the VCR 12 as described above. Tone decoder IC5 has an unusually large value capacitor C4 connected to pin 1 for slowing the decoder response time so that it will not lock up on harmonic or short tone transients. However, because of capacitor C4, once the tone decoder has locked onto the edit tone it normally would be unable to release rapidly when the edit tone stops. To overcome this undesirable problem, a novel circuit is employed consisting of transistor Q8, two resistors R2, R3, and a diode D3. Without Q8, IC5 pin 8 would oscillate off and on for one to two seconds while the decoder tries to unlatch after the end of the edit tone, while capacitor C4 connected to pin 1 slowly recharges. Transistor Q8 overcomes the problem by driving C4 back to a high state immediately after the tone decoder has locked onto the edit tone. Because pin 1 is now high, the decoder will release instantly when the edit tone ends. In this way, means is provided for causing accelerated response by the decoder upon edit tone termination.

Control Input/Output

Because of the lack of VCR control standards, three different input/outputs are provided to accomodate all various types and brands of VCR's. Input/output (A), driven by transistors Q1 and Q2, provides a signal which is normally low and goes to plus 8 volts whenever the edit tone is being decoded. Input/output (C) is the opposite of input/output (A) and is driven by transistors Q5 and Q6, which produces an 8 volt output, which goes to 0 volts when the edit tone is being decoded. Input (B) is actually a current input and is driven by transistors Q3 and Q4. Input (B) pulls the input signal from VCR 12 low for approximately one half second at the beginning and end of each decoded edit tone.

Start/End Tone Generator

The start/end tone also is generated by IC2. When the start/end tone switch SW4, located suitably for user control, is closed, transistor Q17 is turned on. This drives transistor Q18 on, pulling IC2 pins 3 and 14 low and causing IC2 to generate two independent tones. One tone appears at pin 2 of IC2 and is routed to monitor audio output jack J3. The other tone appears at pin 15 of IC2 and is routed through tone level control R1, also positioned for user control, and then to playback VCR audio output jack J4. This tone, as noted, is recorded on the master tape at the beginning and end of an editing sequence. Closing of switch SW4 also causes Q12 transistor to turn on, causing monitor 13 to display a color picture if the video monitor switch SW2 on the front panel is in the "on" position. A suitable panel display is provided by LED 1, which is caused to light. Switch SW4 also disables the edit tone decoder IC6 through diode D4 to prevent the tone generating and decoding circuits from becoming locked up.

Start/End Decoder

The start/end tone is recorded on the master video tape by VCR 11 in the same fashion as the edit tone previously described. When it is played back, as with the edit tone, it is routed through playback VCR audio in jack J5 and through IC1, an audio amplifier; then to IC6, a phase locked tone decoder. The output of IC6 is pin 8, which is normally high and goes low when the start/end tone is decoded, for turning transistor Q16 on and thereby pulling pins 3, 13, and 14 of IC2 low. This causes a tone to be generated at pin 2, which is then fed to monitor audio out jack J3. The start/end tone is not generated at pin 15 because pin 13 is being pulled low at the same time pin 3 and 14 are being pulled low. This prevents a situation where the start/end tone would be fed to VCR 11 and then back to the decoder causing these circuits to be locked up. IC6 pin 8 also turns transistors Q19 and Q20 off, which triggers IC7. IC7 is a time delay circuit which after approximately one second causes pin 3 output to go to a low state. When the start/end tone ceases, pin 8 of IC6 then goes high causing Q19 and Q20 to turn on again, which causes IC7 to reset which causes pin 3 of IC7 to go high, which then causes pin 14 of IC8 to go high. If dub video/audio (stand-by) switch SW3 is in the audio position, IC8 will not count the input signal at pin 14. If the switch is in the video position IC8 will count the input at pin 14, and LED 4 will also be illuminated to so signal the user.

General Control System

Control system 20 may be noted as including IC8. IC8 is a divide-by-ten counter which steps one digit each time pin 14 goes high. This counter is used as a memory to keep track of in which mode the system is operating when automatic self-editing is being carried out.

IC8 controls system modes as follows:

1. SW3 is an audio dub position (i.e., when edit tones are to be recorded on the master tape). IC8 locked in reset mode by pin 15 held high.

2. SW3 is in a dub video position (i.e., when edit tones are to be decoded upon playing back of the master tape).

A. IC8 pin 15 is held low by Q23 which enables IC8 to count input signals at pin 14.

B. Edit tone decoder IC5 is prevented from controlling input/outputs (A), (B), or (C) since Q21, Q22, and Q7 are off because IC8 pin 2 is still in the low state. LED 6, which signals "ready to record" when illuminated, is also still off.

C. When a start/end tone is decoded, causing IC8 pin 14 first to pulse low, then high, the counter (IC8) advances one count which causes IC8 pin 2 to go to the high state. This causes Q21 to drive Q22 on, which in turn causes the LED6 to turn on. Transistor Q7 cannot turn on because its emitter is at the same voltage as its base.

D. With Q7 now enabled, edit tone decoder IC5 can now control inputs/outputs (A), (B), and (C). When an edit tone is decoded by IC5, pin 8 goes low, pulling the emitter of Q7 low which also causes the base of Q7 to drop in voltage. LED6 is thereby turned off. With Q7 now on, LED7 is turned on, and Q1 and Q2 are turned off, causing input/output (A) to go high and also causing C5 to provide a pulse to Q3 and Q4 for pulling input (B) low for approximately one-half second. Q5 and Q6 are also turned on, pulling input/output (C) low. When the edit tone ceases, IC5 pin 8 goes high turning Q7 off and LED 6 on. This turns off LED7 and drives on Q1 and Q2, pulling input/output (A) low and discharging C5. Q5 and Q6 are then turned off causing input/output (C) to go high and causing C6 to provide a pulse to Q3 and Q4 for pulling input (B) low for approximately one-half second.

E. At the conclusion of a selected tape portion, and upon decoding of the ending start/end tone, IC8 pin 2 goes low and pin 4 goes high. As pins 4 and 13 are tied together, pin 13 is an input which will lock IC8 at this point until it is reset externally by IC9. At the same time, Q24 and Q25 are turned off, which causes IC9 to begin timing. IC9 is a stop warning timer for timing of about 10 seconds. At this time, Q27 and Q28 are also turned on, causing the stop indicator LED5 to light, and also turning on Q26 for causing the special output J9 to go high. The special output J9 is provided to operate accessory stop warning indicators. The warning alerts the operator to stop the playback VCR. Warning buzzer 16 and stop solenoid 18 accessory may be connected to J9. At the end of IC9's 10-second timing period, its pin 3 goes low, turning off Q23 and permitting pin 15 of IC8 to go high. Pin 15 of IC8 is a reset input which clears IC8 and returns it to zero count, causing IC8 pin 4 to go low for causing Q24 and Q25 to turn back on. This resets IC9, and turns off Q27 and Q28, which thereby turns off Q26 for causing the output J9 to drop back to a low state once more.

Audio Control for Monitor Television

Figure 3:
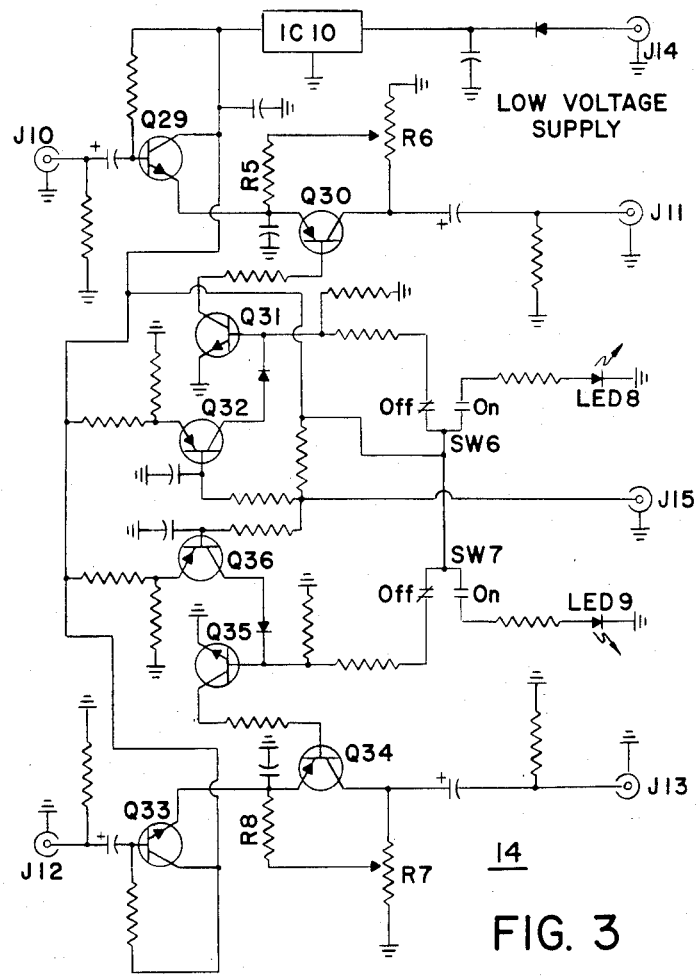
FIG. 3 is a schematic circuit diagram of certain audio control circuitry of the invention.

As shown in FIG. 3, control 14 comprises two identical audio switching circuits for use with stereophonic channels, but either circuit may be used for a monaural channel. As both circuits are identical, only one will be described in detail. The circuit to be described consists of SW6, LED8, Q32, Q31, Q30, Q29, R5, R6, J15, J10, and J11. Input jack J15 feeds the D.C. control signal from editor 10 to both such audio circuits.

Referring momentarily to FIG. 4, it is noted that resistor R4 is connected between J3 and pin 8 of IC5. The latter is normally high except when an edit tone is being decoded, at which time it goes low. The audio tone generated by IC2 pin 2 is superimposed upon this D.C. level and is not affected by the presence of the D.C. level. This allows the monitor output jack J3 to serve a dual function. One function is as described above concerning the edit and start/end tone generating circuits. The other function is to provide a D.C. voltage level shift, as controlled by IC5, the edit tone decoder, and thereby permitting remote control of accessories by connection with jack J3.

Referring again to FIG. 3, the operation of control 14 is as follows: The D.C. level from jack J3 is delivered to an accessory control input jack J15 which is common to both the audio circuits, and thence to transistor Q32. Because this D.C. level is high except when the edit tone is being decoded, transistor Q32 is turned off. With Q32 in the off mode, transistor Q31 can now be controlled only by a user-accessible audio monitor function switch SW6. When SW6 is in the off position, transistor Q31 is locked in its conductive mode in which Q32 cannot control Q31. When SW6 is in its on position, Q31 is controlled by Q32. Audio from VCR 12 is brought into audio input jack J10 and fed through a coupling capacitor to transistor Q29 for being amplified. It is then fed to a divider network consisting of transistor Q30, resistor R5, and an audio level control potentiometer R6. When Q30 is on, the audio is fed directly to the coupling capacitor and then to the audio output jack J11. When Q30 is off, the audio is fed through R5 to potentiometer R6, which permits the audio level to be adjusted suitably. When switch SW6 is in the on position, and when the edit tone is not being decoded, Q32 is turned off, Q31 is in turn turned off, and Q30 is thereby turned off. The audio will then pass at the level determined by potentiometer R6. However, when SW6 is in the on position but the edit tone is being decoded, Q32 turns on, causing Q31 to turn on and Q30 thereby to turn on, so that audio is then fed at full volume directly to the audio output jack J11, bypassing potentiometer R6. In summary, full audio level is provided whenever the edit tone is being decoded as present on the master tape portion being played back, but a diminished audio level is provided whenever an edit tone is not being decoded. If the audio monitor function switch is placed in the off position, transistors Q31 and Q30 are switched on and the audio will pass through at the full volume level without being controlled by the editor 10.

Power Supply And System Construction

A suitable low voltage such as 12 V.D.C. (see FIG. 4) is made available to jack J6 and through a main power control switch SW5 to a first voltage regulator IC3 for establishing a first voltage level suitable for developing collector-emitter voltages for system transistors. Thus, voltage is provided to a further voltage regulator IC4 for establishing a still lower second voltage (such as 5 V.D.C) suitable for the system integrated circuits. Now referring to FIG. 1:

System 10 is readily housed within a small enclosure having a front panel for level control R1, the various switches SW1, SW2, etc., and for the various lightemitting diodes (LED's) described which indicate status of the system. The various jacks J1, J2, etc., of system 10 are preferrably located on a rear panel of the enclosure. Thereby, the user readily may control and observe the various modes of operation.

Clearly, the new editing system 10 with or without editing system 14 may be built into a VCR or other video recorder for use in preparing tapes on the VCR or other recorder for subsequent self-editing playback to another VCR or recorder. Output J9 of the system may be connected with suitable interval switching means for selective automatic shutting off of the VCR or other recorder with which the system is built.

Although conventional integrated circuits and discrete circuit elements are disclosed, circuitry of the invention readily may be implemented by LSI (Large Scale Integrated) circuitry, and such is especially appropriate for the direct incorporation of the system into a VCR or other video recorder.

Processing with the System

Editing system 10, in operation, is used to carry out a process of preparing a video tape, most preferrably color, in order to utilize fully the system capabilities, for video self-editing when subsequently played across from VCR 11 to VCR 12. Of course, such tape has an audio track. Such process involves the steps of:

(a) playing an initial portion of the tape on VCR 11 while simultaneously viewing the same on monitor 13, which is connected to VCR 11 via system 10, to the conclusion of a first segment selected for such subsequent duplication;

(b) while so playing and viewing, laying down on the audio track signal means, namely, the edit tones, both to differentiate portions of the video tape then selected for duplication from unselected portions thereof, and to start and stop VCR 12;

(c) so controlling, by the presence or absence of the edit tones, the video input to monitor 13 as to delete color from its video input simultaneously with the display on monitor 13 of unselected portions of the master video tape;

(d) repeating the aforesaid steps for subsequent portions of the tape.

Accordingly, by adjusting the position on the tape at which the edit tones are laid down on its audio track, the absence of color on monitor 13 indicates those portions which will be self-edited from the tape when thereafter played across to VCR 12.

Editing system 10 is further capable of carrying out a process of duplicating, on VCR 12, only those portions of the master tape which have been preselected for duplication. First, of course, such process involves preparing the color video tape as above described, but further includes the steps of:

(a) first connecting VCR 12 to VCR 11 as above described, it being understood that the user may rent or borrow the second VCR only when actually ready to duplicate the master tape in an edited form;

(b) so controlling VCR 12, by use of system 10, to cause it to respond to the edit tones to start and stop automatically. Such requires no user intervention, as editing system 10 provides the appropriate start and stop commands to VCR 12 by connection with the camera pause control input of VCR 12. Then:

(c) continuously playing the master tape from VCR 11 across to VCR 12 while the latter starts and stops responsive to the edit tones.

Accordingly, production by VCR 12 of a first-copy tape containing the selected video signals only may be completed in a single uninterrupted playing of the playback VCR 11. If the start/end tones are laid down before the beginning and after the end of the desired segment, the editing processes will be automatically initiated and terminated by system 10, if its control switches are appropriately set, once VCR 11 is placed in its "playback" mode.

Assuming that one has obtained a master video tape which has been already prepared by laying down on its audio track the edit tone for marking the selected portions, editing system 10 can be used with any two VCR's for carrying out the above-described copy process.

Of course, such processes are best implemented by using the capability of editing system 10 to cause the monitor 13 to delete color from the video monitor screen, so that the unselected portions are displayed in black-and-white. Still, if the master video tape is in black-and-white, editing system 10 may, if incorporating the audio control 14, be used to differentiate the selected portions from the unselected portions, since the system provides controlling, in accordance with the decoded presence or absence of the edit tones, of the volume of the sound system of monitor 13 so as to diminish same substantially simultaneously with the display on monitor 13 of unselected portions of the tape. The diminution of sound indicates those portions which will be self-edited from the tape as it is recorded by VCR 12. If the tape is in color, system 10 additionally causes color to be deleted from the input to monitor 13 during display of the unselected portions.

A convenient use of the present invention is in making a first copy tape from two or more pre-edited master tapes. For example, if scenes chosen from a pre-edited master tape are in the desired order, but titles are to be inserted for selected groups of scenes, a second tape is made and preedited, showing titles for each group of scenes, and in the same order. To make a titled first-copy tape, the pre-edited title tape is inserted in the playback VCR and played to its first stopping point. It is then removed, the scene tape substituted, and the group of scenes related to that title is played across. Using the capability provided by the controlling tones, each of the pre-edited tapes is then alternately reinserted and played to its appropriate stopping point, until the desired copy tape has been composed. This is achieved without any rewind or keying of the pre-edited tapes utilized.

While in the foregoing description the edit tone is described as being laid down continuously for each portion selected for inclusion in the copy tape (or as an obvious alternative, for exclusion therefrom), the circuitry might instead be designed so that, as with the start-end tone, an edit tone merely marks the beginning or end of each portion so selected for inclusion in the copy tape.

A wholly new methodology is seen to be provided in accordance with the invention, as well as extremely advantageous, relatively simple, and low-cost apparatus which can be used with the wide variety of video recording equipment which is on the market today, being of advantage not only to domestic users but also businesses and commercial concerns as well.

In view of the foregoing, the various objects of the invention are seen to be attained and other advantageous results achieved also.

As various modifications could be made in the constructions and processes herein described and illustrated without departing from the scope of the invention, it is intended that all matter contained in the foregoing description or shown in the accompanying drawings shall be interpreted as illustrative rather than limiting.

What is claimed is:

1. The process of preparing a color video tape having an audio track for video self-editing when subsequently played across to a video recorder, comprising the steps of playing an initial portion of such tape on a video playback machine and simultaneously viewing same on a color video monitor connected therewith, to the conclusion of a first segment selected for such subsequent duplication, while so playing and viewing, laying down on such audio track signal means both to differentiate portions of the video tape then selected for duplication from unselected portions thereof, and to start and stop such video recorder, so controlling, by the presence or absence of said signal means, the video input to the monitor as to delete color from such video input simultaneously with the display on such monitor of unselected portions of the video tape, and repeating the aforesaid steps for subsequent portions of the tape, whereby, by adjusting the position at which such signal means are laid down on the audio track, the absence of color on the monitor screen indicates those portions which will be self-edited from the tape when thereafter played across to such video recorder.

2. The process of duplicating, on a video recorder, only those portions of a color video tape which have been preselected for duplication, the video tape being of the type having an audio track, comprising the process of preparing a color video tape for self-editing as set forth in claim 1, together with the steps thereafter of connecting a video recorder to the playback machine, then so controlling the thus-connected video recorder as to cause it to respond to said signal means to start and stop, while continuously playing the video tape from the playback machine across to said video recorder as it starts and stops responsive to said signal means, whereby production by said video recorder of a tape containing the selected video segments only may be completed in a single uninterrupted playing of the playback machine.

3. The process of preparing a video tape having two audio tracks, one of which has been utilized for sound recording for self-editing when subsequently played across to a video recorder, comprising the steps of playing an initial portion of such tape on a video playback machine and simultaneously displaying the video signal thereof on a video monitor screen and playing the recorded audio track on a sound system connected therewith, to the conclusion of a first segment selected for such subsequent duplication, while so playing and viewing, laying down on the second such audio track signal means both to differentiate portions of the video tape then selected for duplication from unselected portions thereof, and to start and stop such video recorder, so controlling, by the presence or absence of said signal means, the volume of such sound system as to diminish same substantially simultaneously with the display on such monitor of unselected portions of the video tape, and repeating the aforesaid steps for subsequent portions of the tape, whereby, by adjusting the position at which such signal means are laid down on the audio track, the diminution of sound indicates those portions which will be self-edited from the tape when thereafter played across to such video recorder.

4. The process of preparing a color video tape having two audio tracks, one of which has been utilized for sound recording, for self-editing when subsequently played across to a video recorder, comprising the steps of playing an initial portion of such tape on a video playback machine and simultaneously viewing same on a color video monitor connected therewith, and playing the recorded audio track on a sound system connected therewith, to the conclusion of a first segment selected for such subsequent duplication, while so playing and viewing, laying down on such second audio track signal means both to differentiate portions of the video tape then selected for duplication from unselected portions thereof, and to start and stop such video recorder, so controlling, by the presence or absence of said signal means, both the input to the monitor screen as to delete color from such input simultaneously with the display on such monitor of unselected portions of the video tape, and the volume of such sound system as to diminish same substantially simultaneously with the display on such monitor of unselected portions of the video tape, and repeating the aforesaid steps for subsequent portions of the tape, whereby, by adjusting the position at which said signal means are laid down on the audio track, the absence of color on the monitor screen and the diminution of sound indicate those portions which will be self-edited from the tape when thereafter played across to such video recorder.

5. The process of duplicating, on a video recorder, only those portions of a video tape which have been pre-selected for duplication, the video tape being of the type hving an audio track, comprising the steps of playing an initial portion of such tape on a video playback maching and simultaneously observing same by the use of monitor means connected therewith, to the conclusion of a first segment selected for such subsequent duplication, while so playing and observing, laying down on such audio track a signal continuing over those portions of the video tape thereby selected for duplication, and repeating the aforesaid steps for subsequent portions of the tape to the conclusion of its portions to be duplicated, and then connecting to the same or similar playback machine, a video recorder in such manner as to cause it to, run only during such continuing signal, and playing the tape from such playback machine across to said video recorder as it runs and stops responsive to the presence or absence, respectively, of such continuing signal.

6. Apparatus for video editing for use with a video playback machine and a video recorder, comprising:

tone generator means for generating a continuing edit tone to be recorded upon an audio track of a master video tape in a video playback machine, first control means for selectively supplying the edit tone to the playback machine for recording upon the audio track continuing over those audio track portions corresponding to portions of the video track thereby selected for duplication, tone decoder means for decoding the edit tone so recorded upon said audio track upon subsequent playback thereof, and video recorder control means to effect recording by the video recorder on a second video tape only during the presence of such continuing edit tone on the master tape in the playback machine, as determined by the tone decoder means, whereby the video recorder containing such second video tape, when connected to the video playback machine containing the master video tape with edit tones so recorded will produce an edited first copy video tape by duplication of only the selected portions of the master video tape.

7. Apparatus for video editing as set forth in claim 6, said first control means being operative for supplying said edit tone for recording upon the audio track only during the length of each of the selected portions of the master video tape, the absence of the edit tone marking unselected portions of the master video tape.

8. Apparatus for video editing as set forth in claim 7, wherein said tone generator means is operative also for generating a signal tone, separate from said edit tone, for being recorded upon the audio track, said tone decoder means being operative for decoding also the signal tone so recorded, and further comprising second tone control means for selectively supplying the signal tone to the playback machine for recording upon the audio track, whereby to mark, in advance, a series of selected portions of the master video tape, the tone decoder means being operative to decode the signal tone for enabling said video recorder control means only upon decoding of such signal tone.

9. Apparatus for video editing as set forth in claim 8 wherein said second control means is operative for selectively supplying a further signal tone to the playback recorder for recording upon the audio track a series of selected portions of the master video tape, said tone decoder means being operative upon decoding said further signal tone for disabling the video recorder control means.

10. Apparatus for video editing as set forth in claim 9 and further comprising digital switch means operative in response to both said first mentioned signal tone and said further signal tone for alternately enabling and disabling the video recorder control means.

11. Apparatus for video editing as set forth in claim 9, and further comprising remote control means for remotely controlling at least the video recorder to allow it to be remotely stopped, and actuating means responsive to decoding by the tone decoder means of said further signal tone for actuating the remote control means to cause stopping of the video recorder upon duplication of said series of selected portions.

12. Apparatus for video editing as set forth in claim 9 and further comprising signal means responsive to the tone decoder means for signalling the user upon decoding by the tone decoder means of said further signal tone, thereby to alert the user upon reaching the end of a series of selected portions of the master video tape.

13. Apparatus for video editing as set forth in claim 6 and further comprising a video monitor for receiving and viewing the video signals from the master video tape played back by the playback recorder, and further control means responsive to decoding of the edit tone for causing the video monitor to provide a characteristic indication to the user upon display on the monitor of unselected portions, of the master video tape.

14. Apparatus for video editing as set forth in claim 13 wherein said characteristic indication is constituted either by deletion of color from, or diminishment of audio volume of, signals provided to the video monitor upon display of unselected tape portions.

15. Apparatus for video editing as set forth in claim 13 wherein the master video tape is recorded in color, the further control means comprising color control means for causing color to be deleted from the video signals from the playback video recorder during playback of unselected portions of the master video tape.

16. Apparatus for video editing as set forth in claim 15 wherein said color control means comprise a band reject filter for rejecting the color subcarrier of video signals supplied by the playback video recorder to the monitor, and electronic switching means responsive to the tone decoder means for switching video signals through the filter in accordance with the decoded absence of the edit tone on the master tape.

17. Apparatus for video editing as set forth in claim 13 wherein the master video tape is recorded with a sound track, there being a sound reproduction system associated with the video monitor for reproducing the sound track, the further control means comprising audio level control means for causing the volume of the reproduced sound to be diminished during display on the monitor of unselected portions of the master video tape.

18. Apparatus for video editing as set forth in claim 17 wherein audio control means includes an audio level control circuit for diminishing the level of audio signals from the sound track and electronic switching means response to the tone decoder means for enabling the audio level control circuit in accordance with the decoded absence of the edit tone.

19. Apparatus for video editing as set forth in claim 6 and further comprising means for causing accelerated response by the tone decoder means upon edit tone termination.

20. Apparatus for video editing, comprising:

tone generator means for generating an edit tone and a start/end tone to be recorded upon a master color video tape which has been preselected for edited duplication, the tape being of the type having two audio tracks, at least a first one of which is utilizable for sound recording, and the other of which may have said edit and start/stop tones recorded thereon, first tone control means for selectively supplying said edit tone to a video playback machine for recording upon said other audio track to differentiate portions of said video track selected for duplication from unselected portions thereof, second tone control means for selectively supplying the start/end tone to the video playback machine for recording upon said other audio track to mark the beginning and end of a segment of the master video tape having portions of the video track selected for such duplication, tone decoder means for decoding the edit and signal tones recorded upon the master video tape, video recorder control means for controlling starting and stopping of a video recorder in response to decoding of the edit tone, edit control means for enabling and disabling said video recorder control means in response to decoding of the start/end tone, a color video monitor for viewing portions of said video tape when played back by the video playback machine, and color control means for causing color to be deleted from video signals supplied from the video playback machine to the video monitor in accordance with the decoded presence or absence of said edit tone, the absence of color on the monitor indicating portions of said video tape which will be self-edited from the video tape when thereafter played across from the video playback machine to the video recorder, whereby the video recorder when connected to the video playback machine will produce an edited first copy video tape by duplication only of the selected portions of the master video tape.

21. Apparatus for video editing as set forth in claim 20 and further comprising a sound system for sound reproduction of sound recorded on said audio tracks upon playback of the master video tape, and audio control means for controlling the level of sound reproduced by the sound system in response to decoding of the edit tone for causing the reproduced sound to be diminished in volume simultaneously with absence of color on the monitor during display on the monitor of unselected portions of the master video tape.

22. The process of making on a video recorder, a first copy tape composed, in pre-selected order, of only those portions of a plurality of video tapes which have been pre-selected for duplication, said video tapes being of the type having an audio track, comprising the steps of playing an initial portion of each such tape on a video playback machine and simultaneously observing same by the use of monitor means connected therewith, to the conclusion of a first segment selected for such subsequent duplication, while so playing and observing, laying down on the audio track of each such tape, signal means both to differentiate portions of the video tape then selected for duplication from unselected portions thereof, and to start and stop such a video recorder, and repeating the aforesaid steps for subsequent portions of the tapes to the conclusion of their portions to be duplicated, whereby to pre-edit each of such tapes, and then connecting, to the same or similar playback machine, a video recorder in such manner as to cause it to respond to said signal means to start and stop, and composing such first copy tape by (a) inserting in the playback machine that tape whose initial portion is first in such pre-selected order, playing the tape from such playback machine across to a copy tape in said video recorder as it starts and stops responsive to said signal means, to the conclusion of its such initial portion, and then removing same, (b) successively inserting in the playback machine the tapes whose initial portions are next in such pre-selected order and playing those tapes from such playback machine across to the video recorder as it starts and stops responsive to said signal means, to the conclusion of their initial portions which follow in such pre-selected order, and removing same, and (c) continuing to re-insert in the playback machine, in the pre-selected order, those tapes whose following portions have been so differentiated for duplication, and successively to play each across to said video recorder, as it starts and stops responsive to said signal means, to the conclusion of the portions so selected, and to remove each, until the completion of such pre-selected order.

* * * * *

UNITED STATES PATENT AND TRADEMARK OFFICE
CERTIFICATE OF CORRECTION

PATENT NO. : 4,618,895

DATED : October 21, 1986

INVENTOR(S) : Bruce R. Wright

It is certified that error appears in the above-identified patent and that said Letters Patent is hereby corrected as shown below:

Column 17, line 27, "hving" should be ---having---.

Column 17, line 29, "maching" should be ---machine---.

Signed and Sealed this

Tenth Day of February, 1987

Attest:

DONALD J. QUIGG

*Attesting Officer*  *Commissioner of Patents and Trademarks*